(12) United States Patent
Hashimoto et al.

(10) Patent No.: US 8,678,811 B2
(45) Date of Patent: Mar. 25, 2014

(54) APPARATUS FOR TAKING OUT MOLDED PRODUCT

(75) Inventors: Takeshi Hashimoto, Kyoto (JP); Yoshiyuki Tokuyama, Kyoto (JP)

(73) Assignee: Yushin Precision Equipment Co., Ltd., Kyoto (JP)

( * ) Notice: Subject to any disclaimer, the term of this patent is extended or adjusted under 35 U.S.C. 154(b) by 107 days.

(21) Appl. No.: 13/535,441

(22) Filed: Jun. 28, 2012

(65) Prior Publication Data
US 2013/0004613 A1 Jan. 3, 2013

(30) Foreign Application Priority Data
Jun. 30, 2011 (JP) ................................. 2011-145672

(51) Int. Cl.
*B29C 45/42* (2006.01)
*B29C 45/40* (2006.01)

(52) U.S. Cl.
CPC ............... *B29C 45/42* (2013.01); *B29C 45/401* (2013.01); *B29C 45/4005* (2013.01); *B23B 37/14* (2013.01)
USPC .......................................... 425/556; 425/444

(58) Field of Classification Search
CPC ............... B29C 45/42; B29C 45/4225; B29C 2045/4068; B29C 45/401; B29C 43/50; B29C 33/442; B29C 45/40; B29C 45/4005; B29C 63/488; B29C 33/308; B29C 37/0007; B22C 9/06; B28B 7/36; B28B 7/366; B28B 7/364; B21B 37/14; B32B 27/12
USPC .................... 249/112; 425/444, 556
See application file for complete search history.

(56) References Cited

U.S. PATENT DOCUMENTS

| | | | | | |
|---|---|---|---|---|---|
| 3,166,796 | A | * | 1/1965 | Wehinger | 249/204 |
| 3,251,483 | A | * | 5/1966 | Devol | 414/728 |
| 4,204,824 | A | * | 5/1980 | Paradis | 425/436 R |
| 4,571,320 | A | * | 2/1986 | Walker | 264/40.1 |
| 4,795,124 | A | * | 1/1989 | Nagai | 249/66.1 |
| 5,028,364 | A | * | 7/1991 | Lee | 264/31 |
| 5,088,686 | A | * | 2/1992 | Soofi | 249/112 |
| 5,257,925 | A | * | 11/1993 | Grimm | 425/556 |
| 5,681,138 | A | * | 10/1997 | Lust et al. | 414/752.1 |
| 5,858,414 | A | * | 1/1999 | Hayashi et al. | 425/73 |
| 6,186,736 | B1 | * | 2/2001 | Lust et al. | 414/800 |
| 7,364,424 | B2 | * | 4/2008 | Kalemba et al. | 425/556 |
| 7,998,377 | B2 | * | 8/2011 | Bergami et al. | 264/40.1 |

(Continued)

FOREIGN PATENT DOCUMENTS

JP     2009-269100     11/2009

*Primary Examiner* — Yogendra Gupta
*Assistant Examiner* — Emmanuel S Luk
(74) *Attorney, Agent, or Firm* — Rankin, Hill & Clark LLP (57) ABSTRACT

An apparatus for taking out a molded product that can effectively suppress peeling of a cured adhesive applied to fix a fiber-reinforced plastic shaped material to each of a pair of opposed sidewalls of an elevating shaft, the sidewalls being opposite each other in a direction orthogonal to the axial direction of the elevating shaft. A fiber-reinforced section of the fiber-reinforced plastic shaped material is formed of a plurality of warp threads and a plurality of weft threads, which are disposed on a surface of the sidewalls of the elevating shaft such that the plurality of warp threads are juxtaposed in a direction orthogonal to the axial direction of the elevating shaft and extend in the axial direction and the plurality of weft threads are juxtaposed in the axial direction and extend in a direction intersecting the axial direction.

9 Claims, 5 Drawing Sheets

(56) References Cited

U.S. PATENT DOCUMENTS

| | | | |
|---|---|---|---|
| 2002/0090415 A1* | 7/2002 | Herbst | 425/556 |
| 2002/0105104 A1* | 8/2002 | Adachi | 264/40.1 |
| 2003/0070502 A1* | 4/2003 | Brett et al. | 74/490.01 |
| 2003/0085481 A1* | 5/2003 | Nasvik et al. | 264/31 |
| 2003/0152661 A1* | 8/2003 | Yu et al. | 425/436 RM |
| 2004/0005372 A1* | 1/2004 | Shirahata et al. | 425/135 |
| 2007/0128308 A1* | 6/2007 | Kalemba et al. | 425/556 |
| 2008/0014295 A1* | 1/2008 | Zoppas et al. | 425/139 |
| 2008/0211126 A1* | 9/2008 | Kobayashi et al. | 264/40.5 |
| 2008/0296801 A1* | 12/2008 | Zoppas et al. | 264/237 |
| 2010/0025188 A1* | 2/2010 | Lanfranchi | 198/377.08 |
| 2012/0031217 A1* | 2/2012 | Jin et al. | 74/490.01 |
| 2012/0039697 A1* | 2/2012 | Jin et al. | 414/737 |
| 2012/0292826 A1* | 11/2012 | Ueha et al. | 264/403 |
| 2013/0004613 A1* | 1/2013 | Hashimoto et al. | 425/443 |
| 2013/0101695 A1* | 4/2013 | Schad et al. | 425/556 |
| 2013/0119573 A1* | 5/2013 | Fradera Pellicer | 264/40.1 |

* cited by examiner

APPARATUS FOR TAKING OUT MOLDED PRODUCT

TECHNICAL FIELD

The present invention relates to an apparatus for taking out a molded product, which includes an elevating shaft.

BACKGROUND OF THE INVENTION

Figure 4A:
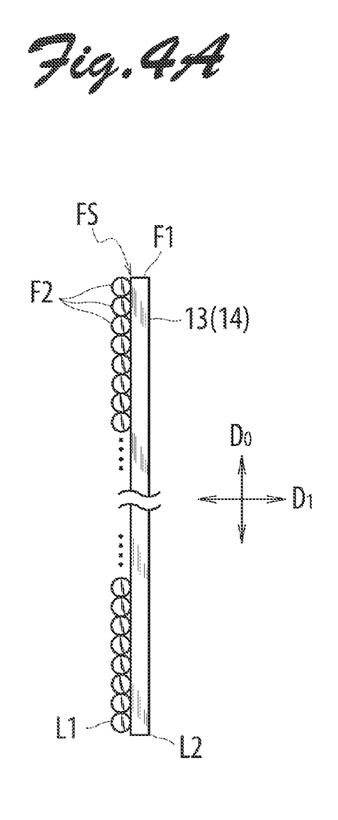
FIGS. 4A and 4B are each a schematic view schematically showing the configuration of a fiber-reinforced section.
Figure 4B:
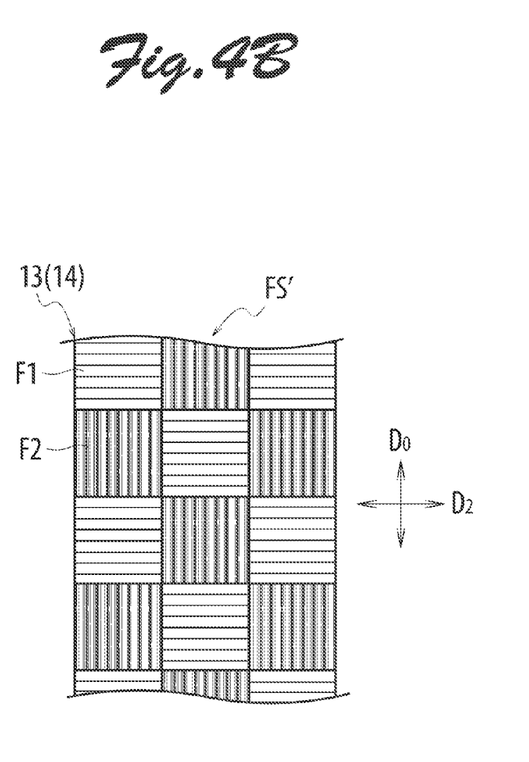
Figure 5:
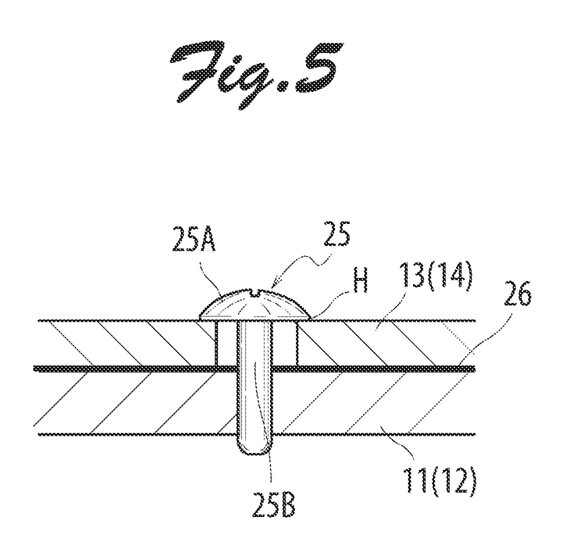
FIG. 5 schematically illustrates a fixing structure with a press-fitting pin.

Japanese Patent Application Publication No. 2009-269100 (JP 2011-269100 A) discloses a traverse-type apparatus for taking out a molded product, which includes a metal elevating shaft and a molded product retaining head provided at an end of the elevating shaft (see FIGS. 4 and 5). The elevating shaft described in the publication is formed from a rectangular cylindrical molded product. The elevating shaft moves in the vertical direction, and therefore a considerable load is applied to a motor for elevation. Thus, in order to reduce the weight of the elevating shaft, the applicant adopted an aluminum elevating shaft with a structure allowing a further weight reduction and, in addition, devised a structure for compensating for a reduction in mechanical strength due to the weight reduction by fixing a fiber-reinforced plastic shaped material to the elevating shaft with an adhesive.

However, the metal material of the elevating shaft, the cured adhesive, and the fiber-reinforced plastic shaped material significantly differ in thermal expansion coefficient. Under some circumstances, the cured adhesive may partially peel off, and the fiber-reinforced plastic shaped material may not fully work.

SUMMARY OF THE INVENTION

An object of the present invention is to provide an apparatus for taking out a molded product that can effectively suppress peeling of a cured adhesive applied to fix a fiber-reinforced plastic shaped material to an elevating shaft.

According to the present invention, an apparatus for taking out a molded product includes a metal elevating shaft, a molded product retaining head attached to an end of the elevating shaft, and a fiber-reinforced plastic shaped material fixed with an adhesive onto each of a pair of opposed sidewalls of the elevating shaft that are provided opposite to each other in a direction orthogonal to an axial direction of the elevating shaft. The fiber-reinforced plastic shaped material is made by providing a fiber-reinforced section formed of a plurality of warp threads and a plurality of weft threads, impregnating the fiber-reinforced section with a thermosetting resin, and curing the thermosetting resin. In the present invention, a fiber-reinforced section of the fiber-reinforced plastic shaped material is formed of a plurality of warp threads and a plurality of weft threads. The warp threads and the weft threads are disposed on a surface of the sidewalls of the elevating shaft such that the plurality of warp threads are juxtaposed in a direction orthogonal to the axial direction of the elevating shaft and extend in the axial direction and the plurality of weft threads are juxtaposed in the axial direction and extend in a direction intersecting the axial direction. The phrase "the plurality of warp threads . . . extend in the axial direction" means that the warp threads extend generally in the axial direction and the phrase should not be construed in such limiting sense that the warp threads extend perfectly in parallel with the axis. The phrase "weft threads . . . extend in a direction intersecting the axial direction" should not be construed in such limiting sense that the weft threads are perfectly orthogonal to the warp threads. Examples of the fiber for use in the fiber-reinforced section include various types of reinforcing fibers such as carbon and glass.

In the present invention, the fiber-reinforced plastic shaped materials are fixed to the pair of sidewalls of the elevating shaft such that the warp threads and the weft threads forming the fiber-reinforced section extend in specific directions with respect to the axial direction of the elevating shaft. Then, it is possible to suppress peeling of the cured adhesive by relieving a stress generated in the cured adhesive due to a difference in thermal expansion coefficient among the metal material of the elevating shaft, the cured adhesive, and the fiber-reinforced plastic shaped materials. The cured adhesive is larger in length in the axial direction of the elevating shaft than in the width direction. Therefore, cumulative elongation of the cured adhesive due to thermal expansion is larger in the axial direction than in the width direction. In addition, the cured adhesive and the cured thermosetting resin in the fiber-reinforced plastic shaped materials are close in thermal expansion coefficient to each other, compared to other materials. Therefore, elongation of the cured adhesive in the axial direction causes elongation of the thermosetting resin in the axial direction, along with which the weft threads are slightly moved in the axial direction. Therefore, it may be assumed that a stress generated between the weft threads and the cured adhesive is relieved. As a result, it is considered that the present invention can suppress peeling of the cured adhesive.

The fiber-reinforced section may include a weft thread layer located to face the surface of corresponding one of the sidewalls and formed only of the plurality of weft threads. This makes the weft threads more easily movable along with expansion and contraction so that a stress generated between the weft threads and the cured adhesive can be further relieved. Even if the fiber-reinforced section is plain-woven, the effect of the present invention can also be obtained although the obtained effect may be smaller.

The elevating shaft may be formed by extruding aluminum. In this case, the surfaces of the pair of sidewalls have preferably been subjected to a surface roughening process. This increases the bonding strength between the sidewalls of the elevating shaft and the cured adhesive.

The fiber-reinforced plastic shaped material may have a pair of long sides extending in parallel with each other. In this case, preferably, the pair of sidewalls of the elevating shaft are each provided with a positioning stepped portion that extends linearly in the axial direction and that contacts one of the pair of long sides to position the fiber-reinforced plastic shaped material. In this case, the positioning stepped portions of the pair of sidewalls are provided at positions which are mirror symmetrical with respect to an imaginary plane including an axis of the elevating shaft and extending between the pair of sidewalls. This allows the fiber-reinforced plastic shaped materials to be positioned perfectly opposite to each other just by bringing one side of the fiber-reinforced plastic shaped materials into abutment with corresponding one of the positioning stepped portions. Thus, fixing the fiber-reinforced plastic shaped materials is facilitated.

Ideally, the fiber-reinforced plastic shaped materials are fixed to the elevating shaft with an adhesive only. In order to enhance reliability, however, screws, press-fitting pins, or the like are preferably used for fixation in addition to fixation with an adhesive. In this case, a plurality of through holes may be formed at predetermined intervals along an outer peripheral portion of the fiber-reinforced plastic shaped material. A plurality of screws or press-fitting pins each having a head portion may penetrate through the plurality of through holes to be fixed to corresponding one of the sidewalls with the head portion pressed onto the reinforced plastic shaped material.

The through holes may be sized to be larger than a maximum diameter of a portion of the screws or the press-fitting pins excluding the head portion and to provide an effect that the cured adhesive does not peel off from the sidewall or the reinforced plastic shaped material due to a difference in thermal expansion coefficient or coefficient of linear expansion among the elevating shaft, the cured adhesive, and the reinforced plastic shaped material. With this configuration, the presence of the screws or the press-fitting pins prevents the fiber-reinforced plastic shaped materials from completely peeling off. In addition, the through holes are sized to be so large, as discussed earlier, that movement of the fiber-reinforced plastic shaped materials along with expansion and contraction is not significantly restrained.

BRIEF DESCRIPTION OF THE DRAWINGS

These and other objects and many of the attendant advantages of the present invention will readily be appreciated as the same becomes better understood by reference to the following detailed description when considered in connection with the accompanying drawings.

DESCRIPTION OF THE PREFERRED EMBODIMENTS

Figure 1:
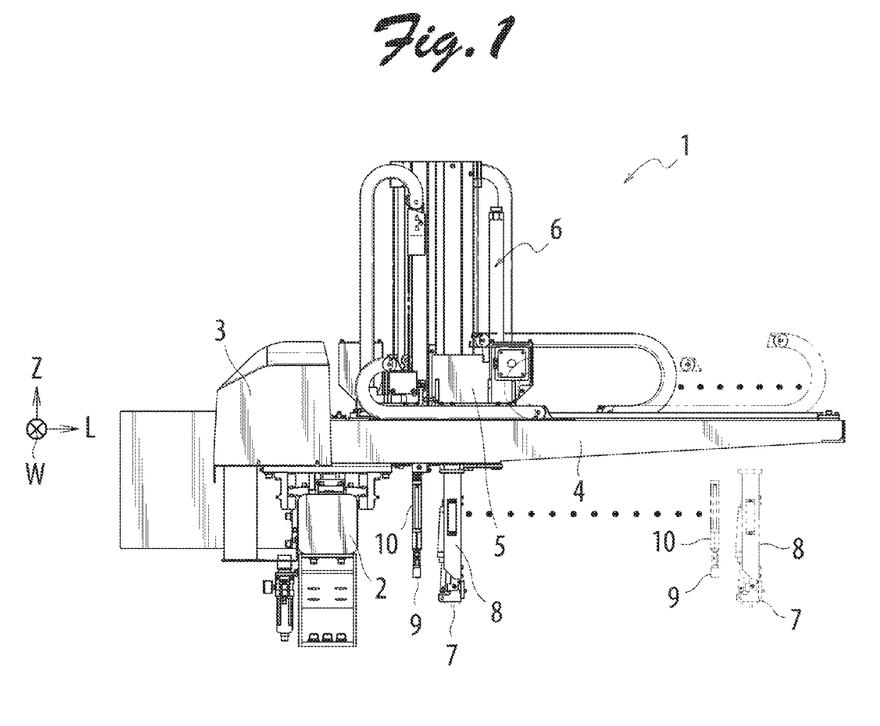
FIG. 1 shows the overall configuration of an apparatus for taking out a molded product according to an embodiment of the present invention.

An apparatus for taking out a molded product according to an embodiment of the present invention will be described below with reference to the drawings. FIG. 1 shows the overall configuration of an apparatus 1 for taking out a molded product according to the embodiment. The apparatus 1 includes a transverse shaft 2, a first transfer body 3, an extraction shaft 4, a second transfer body 5, and an elevating unit 6. The transverse shaft 2 has a cantilever beam structure in which a base portion of the transverse shaft 2 is supported by a fixing platen of a molding device (not shown) so that the transverse shaft 2 extends in the width direction (as indicated with arrow W in FIG. 1) of the molding device. The first transfer body 3 is supported by the transverse shaft 2 to be advanced and retracted in the width direction (arrow W) by a drive source having an electric motor such as a servo motor, for example. The extraction shaft 4 is provided on the first transfer body 3 to extend in the longitudinal direction (as indicated with arrow L in FIG. 1) of the molding device. The second transfer body 5 is supported by the extraction shaft 4 to be advanced and retracted in the longitudinal direction (arrow L) by a drive source having an electric motor such as a servo motor, for example. The elevating unit 6 is supported by the second transfer body 5 to be elevated and lowered (arrow Z in FIG. 1) by a drive source having an electric motor such as a servo motor or an air cylinder device, for example. The elevating unit 6 includes a first elevating shaft 8 including a molded product retaining head 7 provided at an end of the shaft 8, and a second elevating shaft 10 including a runner chuck 9 provided at an end of the shaft 10. Operation of the apparatus 1 is known in the art, and therefore is not described herein.

Figure 2A:
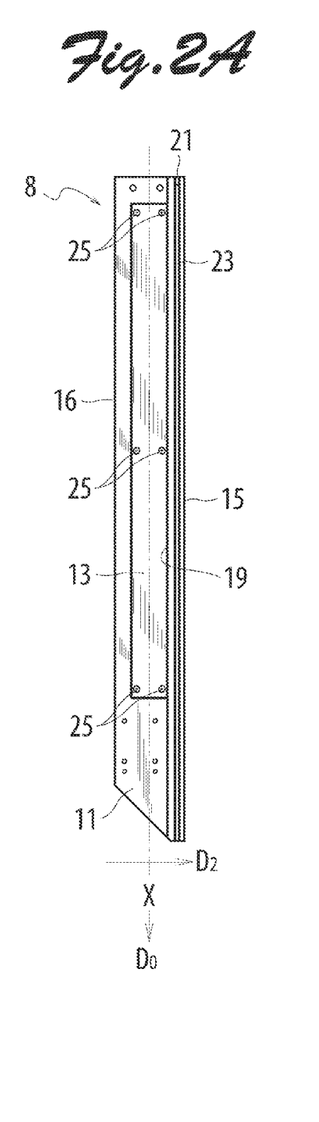
FIGS. 2A to 2C are a left side view, a right side view, and a perspective view, respectively, of an elevating shaft.
Figure 2B:
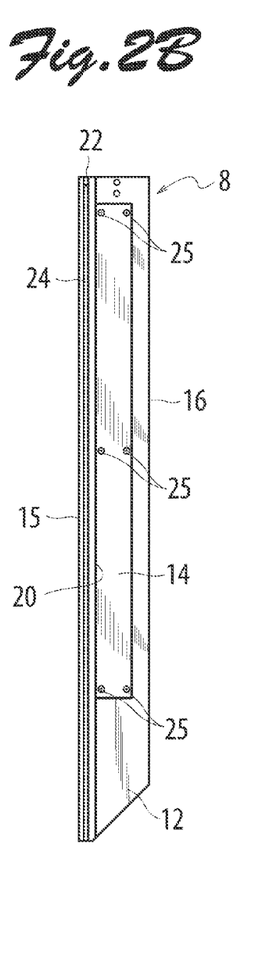
Figure 2C:
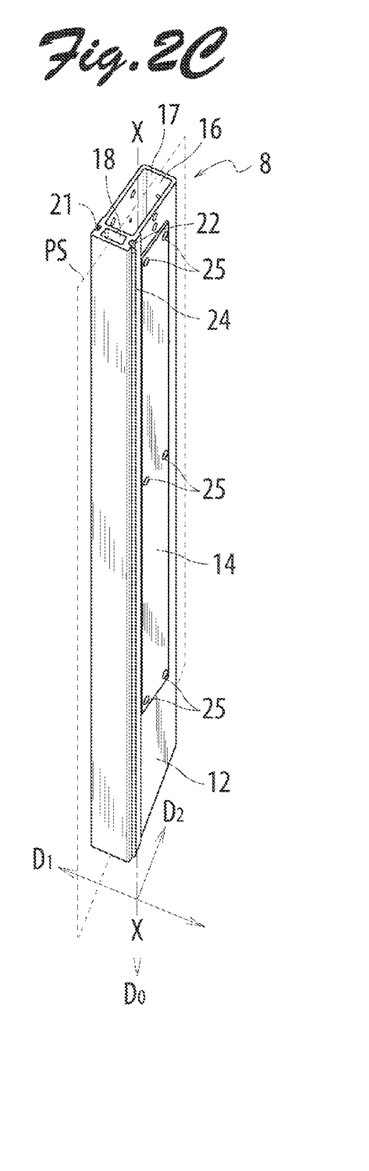
Figure 3:
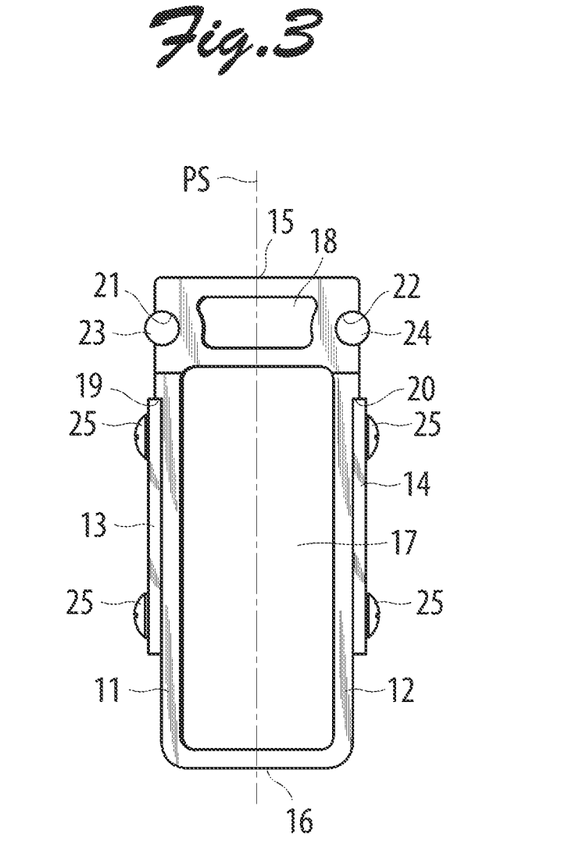
FIG. 3 is a bottom view of the elevating shaft.

In order to reduce the weight of the elevating shaft 8 including the molded product retaining head 7 attached to an end of the shaft 8 while maintaining the mechanical strength of the elevating shaft 8, in particular, the embodiment adopts the following structure. FIGS. 2A to 2C are a left side view, a right side view, and a perspective view, respectively, of the elevating shaft 8. FIG. 3 is a bottom view of the elevating shaft 8. The elevating shaft 8 is formed by extruding aluminum or an aluminum alloy, and therefore has a hollow structure. Fiber-reinforced plastic shaped materials 13 and 14 are fixed with an adhesive onto a pair of opposed sidewalls 11 and 12, respectively, of the elevating shaft 8 that are provided opposite to each other in a direction ($D_1$ direction shown in FIG. 2C) orthogonal to the axial direction ($D_0$ direction, or axis X shown in FIG. 2C) of the elevating shaft 8. The elevating shaft 8 has a pair of sidewalls 15 and 16 located between the pair of sidewalls 11 and 12 to couple the sidewalls 11 and 12 to each other. The elevating shaft 8 has an elongated first cavity portion 17 corresponding to the fiber-reinforced plastic shaped materials 13 and 14, and a second cavity portion 18 with a smaller cross-sectional area located on the sidewall 15 side with respect to the first cavity portion 17.

As shown in FIG. 3, a pair of positioning stepped portions 19 and 20 are formed on the pair of sidewalls 11 and 12, respectively, at positions facing the first cavity portion 17 and close to the second cavity portion 18. The pair of positioning stepped portions 19 and 20 provided on the pair of sidewalls 11 and 12, respectively, are provided at positions which are mirror symmetrical with respect to an imaginary plane PS including the axis X of the elevating shaft 8 and extending between the pair of sidewalls 11 and 12. A pair of elongated recessed grooves 21 and 22 extending in the axial direction are formed in the pair of sidewalls 11 and 12, respectively, at positions across the second cavity portion 18. Columnar rail members 23 and 24 are press-fitted into the recessed grooves 21 and 22, respectively, for fixation. The rail members 23 and 24 are utilized as guides when the elevating shaft 8 is elevated and lowered.

The fiber-reinforced plastic shaped materials 13 and 14 are each formed in a thin plate shape having a pair of long sides extending in parallel with each other. In the embodiment, one of the pair of long sides of the fiber-reinforced plastic shaped materials 13 and 14 is brought into contact with corresponding one of the pair of positioning stepped portions 19 and 20 provided on the pair of sidewalls 11 and 12, respectively, of the elevating shaft 8 and extending linearly in the axial direction to position the fiber-reinforced plastic shaped materials 13 and 14. This allows the fiber-reinforced plastic shaped materials 19 and 20 to be positioned perfectly opposite to each other in the $D_1$ direction just by bringing one side of the fiber-reinforced plastic shaped materials 13 and 14 into abutment with corresponding one of the positioning stepped portions 19 and 20. Thus, fixing the fiber-reinforced plastic shaped materials 13 and 14 is facilitated.

The fiber-reinforced plastic shaped materials 13 and 14 are made by providing a fiber-reinforced section formed of a plurality of warp threads and a plurality of weft threads, impregnating the fiber-reinforced section with a thermosetting resin, and curing the thermosetting resin. In the embodiment, in particular, carbon fiber-reinforced plastic shaped materials are used as the fiber-reinforced plastic shaped materials 13 and 14. For example, in the embodiment, as shown in FIG. 4A, a fiber-reinforced section FS includes a weft thread layer L1 located to face the surface of corresponding one of the sidewalls 11 and 12 and formed only of a plurality of carbon fiber weft threads F2, and a warp thread layer L2 located not to face the surface of corresponding one of the sidewalls 11 and 12 and formed only of a plurality of carbon fiber warp threads F1. An epoxy thermosetting resin is used as the resin with which the fiber-reinforced section FS is impregnated.

In the embodiment, the plurality of warp threads F2 and the plurality of weft threads F1 forming the fiber-reinforced section FS of the fiber-reinforced plastic shaped materials 13 and 14 are disposed on a surface of the sidewalls 11 and 12 of the elevating shaft 8 such that the plurality of warp threads F2 are juxtaposed in a direction (Y direction) orthogonal to the axial direction ($D_0$ direction shown in FIG. 4) of the elevating shaft 8 and extend in the axial direction and the plurality of weft threads F1 are juxtaposed in the axial direction ($D_0$ direction) and extend in a direction ($D_2$ direction shown in FIG. 4B) intersecting the axial direction. In the structure of the fiber-reinforced section FS shown in FIG. 4A, the plurality of warp threads F2 and the plurality of weft threads F1 are substantially orthogonal to each other.

In the embodiment, the fiber-reinforced plastic shaped materials 13 and 14 are fixed using an adhesive to the pair of sidewalls 11 and 12, respectively, of the elevating shaft 8 such that the warp threads F2 and the weft threads F1 forming the fiber-reinforced section FS extend in specific directions with respect to the axial direction of the elevating shaft 8. Then, it is possible to suppress peeling of the cured adhesive (not shown) by relieving a stress generated in the cured adhesive due to a difference in thermal expansion coefficient or coefficient of linear expansion among the metal material of the elevating shaft 8, the cured adhesive, and the fiber-reinforced plastic shaped materials 13 and 14. In the embodiment, an epoxy or acrylic adhesive, for example, is used as the adhesive. In the embodiment, the surfaces of the pair of sidewalls 11 and 12 have been subjected to a surface roughening process such as brushing. This increases the bonding strength between the sidewalls 11 and 12 of the elevating shaft 8 and the cured adhesive.

The fiber-reinforced section FS may include a weft thread layer located to face the surface of corresponding one of the sidewalls and formed only of the plurality of weft threads as shown in FIG. 4A. This makes the weft threads more easily movable along with expansion and contraction so that a stress generated between the weft threads and the cured adhesive can be further relieved. Alternatively, the fiber-reinforced section FS' may be plain-woven as shown in FIG. 4B. Even if the fiber-reinforced section is plain-woven, the effect of the present invention can also be obtained although the obtained effect may be smaller.

Ideally, the fiber-reinforced plastic shaped materials 13 and 14 are fixed to the elevating shaft 8 with an adhesive only. In order to enhance reliability, however, press-fitting pins 25 are used for fixation in addition to fixation with an adhesive in the embodiment. Thus, in another embodiment, as shown in FIG. 5, a plurality of through holes H are formed at predetermined intervals along the outer peripheral portion of the fiber-reinforced plastic shaped materials 13 and 14. Then, a plurality of press-fitting pins 25 each having a head portion 25A penetrate through the plurality of through holes H to be fixed to corresponding one of the sidewalls 11 and 12 with the head portion 25A pressed onto corresponding one of the reinforced plastic shaped materials 13 and 14. The through holes H are sized to be larger than the maximum diameter of a portion 25B of the press-fitting pins 25 excluding the head portion 25A and to provide an effect that the cured adhesive 26 does not peel off from corresponding one of the sidewalls 11 and 12 or corresponding one of the reinforced plastic shaped materials 13 and 14 due to a difference in thermal expansion coefficient coefficient or coefficient of linear expansion among the elevating shaft 8, the cured adhesive 26, and the reinforced plastic shaped materials 13 and 14. With this configuration, the presence of the press-fitting pins 25 prevents the fiber-reinforced plastic shaped materials 13 and 14 from completely peeling off. In addition, the through holes H are sized to be so large that movement of the fiber-reinforced plastic shaped materials 13 and 14 along with expansion and contraction is not significantly restrained.

Screws may be used in place of the press-fitting pins 25 used in the embodiment described above.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. An apparatus for taking out a molded product, comprising:
   a metal elevating shaft;
   a molded product retaining head attached to an end of the elevating shaft; and
   a fiber-reinforced plastic shaped material fixed with an adhesive onto each of a pair of opposed sidewalls of the elevating shaft that are provided opposite to each other in a direction orthogonal to an axial direction of the elevating shaft, the fiber-reinforced plastic shaped material being made by providing a fiber-reinforced section formed of a plurality of warp threads and a plurality of weft threads, impregnating the fiber-reinforced section with a thermosetting resin, and curing the thermosetting resin, wherein
   the plurality of warp threads and the plurality of weft threads are disposed on a surface of the sidewalls such that the plurality of warp threads are juxtaposed in a direction orthogonal to the axial direction of the elevating shaft and extend in the axial direction and the plurality of weft threads are juxtaposed in the axial direction and extend in a direction intersecting the axial direction.

2. The apparatus for taking out a molded product according to claim 1, wherein
   the fiber-reinforced section includes a weft thread layer located to face the surface of corresponding one of the sidewalls and formed only of the plurality of weft threads.

3. The apparatus for taking out a molded product according to claim 1, wherein
   the fiber-reinforced section is plain-woven.

4. The apparatus for taking out a molded product according to claim 1, wherein:
   the elevating shaft is formed by extruding aluminum; and
   the surfaces of the pair of sidewalls have been subjected to a surface roughening process.

5. The apparatus for taking out a molded product according to claim 1, wherein:
   the fiber-reinforced plastic shaped material has a pair of long sides extending in parallel with each other; and
   the pair of sidewalls are each provided with a positioning stepped portion that extends linearly in the axial direction and that contacts one of the pair of long sides to position the fiber-reinforced plastic shaped material, the positioning stepped portions of the pair of sidewalls being provided at positions which are mirror symmetrical with respect to an imaginary plane including an axis of the elevating shaft and extending between the pair of sidewalls.

6. The apparatus for taking out a molded product according to claim 1, wherein:
   a plurality of through holes are formed at predetermined intervals along an outer peripheral portion of the reinforced plastic shaped material;
   a plurality of screws or press-fitting pins each having a head portion penetrate through the plurality of through holes to be fixed to corresponding one of the sidewalls with the head portion pressed onto the reinforced plastic shaped material; and
   the through holes are sized to be larger than a maximum diameter of a portion of the screws or the press-fitting pins excluding the head portion and to provide an effect that the cured adhesive is not peeled off from the sidewall or the reinforced plastic shaped material due to a difference in thermal expansion coefficient among the elevating shaft, the cured adhesive, and the reinforced plastic shaped material.

7. The apparatus for taking out a molded product according to claim 1, wherein
   the fiber-reinforced plastic shaped material is a carbon fiber-reinforced plastic shaped material.

8. The apparatus for taking out a molded product according to claim 2, wherein:
   the elevating shaft is formed by extruding aluminum; and
   the surfaces of the pair of sidewalls have been subjected to a surface roughening process.

9. The apparatus for taking out a molded product according to claim 3, wherein:
   the elevating shaft is formed by extruding aluminum; and
   the surfaces of the pair of sidewalls have been subjected to a surface roughening process.

* * * * *